US012632657B2

(12) United States Patent
Sainath et al.

(10) Patent No.: US 12,632,657 B2
(45) Date of Patent: May 19, 2026

(54) JOINT SPEECH AND TEXT STREAMING MODEL FOR ASR

(71) Applicant: Google LLC, Mountain View, CA (US)

(72) Inventors: Tara N. Sainath, Jersey City, NJ (US); Zhouyuan Huo, Mountain View, CA (US); Zhehuai Chen, Edgewater, NJ (US); Yu Zhang, Mountain View, CA (US); Weiran Wang, Palo Alto, CA (US); Trevor Strohman, Mountain View, CA (US); Rohit Prakash Prabhavalkar, Palo Alto, CA (US); Bo Li, Fremont, CA (US); Ankur Bapna, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 18/346,232

(22) Filed: Jul. 1, 2023

(65) Prior Publication Data

US 2024/0028829 A1 Jan. 25, 2024

Related U.S. Application Data

(60) Provisional application No. 63/369,064, filed on Jul. 21, 2022.

(51) Int. Cl.
*G06F 40/284* (2020.01)
*G06F 40/40* (2020.01)

(52) U.S. Cl.
CPC ............ *G06F 40/284* (2020.01); *G06F 40/40* (2020.01)

(58) Field of Classification Search
None
See application file for complete search history.

(56) References Cited

U.S. PATENT DOCUMENTS

2020/0027444 A1* 1/2020 Prabhavalkar .......... G10L 15/02
2021/0312905 A1* 10/2021 Zhao ....................... G10L 15/16
(Continued)

OTHER PUBLICATIONS

E. Variani, D. Rybach, C. Allauzen and M. Riley, "Hybrid Autoregressive Transducer (HAT)," ICASSP 2020-2020 IEEE International Conference on Acoustics, Speech and Signal Processing (ICASSP), Barcelona, Spain, 2020, pp. 6139-6143, doi: 10.1109/ICASSP40776.2020.9053600. (Year: 2020).*

(Continued)

*Primary Examiner* — Daniel C Washburn
*Assistant Examiner* — Tyler Becker
(74) *Attorney, Agent, or Firm* — Honigman LLP; Brett A. Krueger; Grant Griffith

(57) ABSTRACT

A method includes receiving training data that includes a set of unspoken textual utterances. For each respective unspoken textual utterance, the method includes, tokenizing the respective textual utterance into a sequence of sub-word units, generating a first higher order textual feature representation for a corresponding sub-word unit tokenized from the respective unspoken textual utterance, receiving the first higher order textual feature representation generated by a text encoder, and generating a first probability distribution over possible text units. The method also includes training an encoder based on the first probability distribution over possible text units generated by a first-pass decoder for each respective unspoken textual utterance in the set of unspoken textual utterances.

22 Claims, 7 Drawing Sheets

(56) References Cited

U.S. PATENT DOCUMENTS

| | | | |
|---|---|---|---|
| 2021/0350786 A1 | 11/2021 | Chen et al. | |
| 2022/0310069 A1* | 9/2022 | Ren | G06N 3/0464 |
| 2023/0169954 A1* | 6/2023 | Thomas | G10L 15/16 |
| | | | 704/200 |

OTHER PUBLICATIONS

International Search Report and Written Opinion for the related PCT application PCT/US2023/026825 dated Sep. 28, 2023.
Karita Shigeki et al: "Semi-supervised End-to-end Speech Recogn1 ion Using Text-to-speech and Autoencoders" May 12, 2019.
Zhehuai Chen et al. "MAESTRO: Matched Speech Text Representations through Modality Matching" Jul. 1, 2022.

* cited by examiner $$P(\hat{y}_i \mid x_0, \dots, x_{t_i}, y_0, \dots, y_{u_{i-1}})$$

Softmax 240

$z_i$

Joint Network 230

$p_{u_i}$ $h_{t_i}^{enc}$

Prediction Network 220

Encoder 210

$y_{u_{i-1}}$ $x_{t_i}$

JOINT SPEECH AND TEXT STREAMING MODEL FOR ASR

CROSS REFERENCE TO RELATED APPLICATIONS

This U.S. Patent Application claims priority under 35 U.S.C. § 119(e) to U.S. Provisional Application 63/369,064, filed on Jul. 21, 2022. The disclosure of this prior application is considered part of the disclosure of this application and is hereby incorporated by reference in its entirety.

TECHNICAL FIELD

This disclosure relates to a joint speech and text streaming model for ASR.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the client speaking and the transcription) based on the ongoing development of deep neural networks. However, one challenge in developing deep learning-based ASR models is the parameters of the ASR models tend to over fit the training data, thereby resulting in the ASR models having difficulties generalizing unseen data when the training data is not extensive enough. As a result, training ASR models on larger training datasets improves the accuracy of the ASR model. Synthesized speech and/or data-augmented speech can be incorporated to increase the volume of training data used to train the ASR models.

SUMMARY

One aspect of the disclosure provides a computer-implemented method that when executed on data processing hardware causes the data processing hardware to perform operations for a joint speech and text streaming model for automatic speech recognition. The operations include receiving training data that includes a set of unspoken textual utterances. Here, each respective unspoken textural utterance in the set of unspoken textual utterances is not paired with any corresponding spoken utterance of speech. For each respective unspoken textual utterance in the set of unspoken textual utterances the operations include: tokenizing the respective unspoken textual utterance into a sequence of sub-word units; generating, by a text encoder of an encoder, a first higher order textual feature representation for a corresponding sub-word unit in the sequence of sub-word units tokenized from the respective unspoken textual utterance at each of a plurality of output steps; receiving, as input to a first-pass decoder, the first higher order textual feature representation generated by the text encoder at each of the plurality of output steps; and generating, by the first-pass decoder, a first probability distribution over possible text units at each of the plurality of output steps. The operations also include training the encoder based on the first probability distribution over possible text units generated by the first-pass decoder at each of the plurality of output steps for each respective unspoken textual utterance in the set of unspoken textual utterances.

Implementations of the disclosure may include one or more of the following optional features. In some implementations, the operations further include, for each respective unspoken textual utterance in the set of unspoken textual utterances: receiving, as input to a non-causal audio-text encoder of the encoder, the first higher order textual feature representation generated by the text encoder at each of the plurality of output steps; generating, by the non-causal audio-text encoder, a second higher order textual feature representation for a corresponding first higher order textual feature representation; receiving, as input to a second-pass decoder, the second higher order textual feature representation generated by the non-causal audio-text encoder at each of the plurality of output steps; and generating, by the second decoder, a second probability distribution over possible text units at each of the plurality of output steps. Here, training the encoder model is further based on the second probability distribution over possible text units generated by the second-pass decoder at each of the plurality of output steps for each respective unspoken textual utterance in the set of unspoken textual utterances. In these implementations, the first-pass decoder and the second-pass decoder may include the same decoder. The non-causal audio-text encoder may include one of a plurality of unidirectional long short-term memory (LSTM) layers, a plurality of conformer layers, or a plurality of transformer layers.

In some examples, the training data further includes a set of transcribed speech utterances where each transcribed speech utterance in the set of transcribed speech utterances is paired with a corresponding transcription and represented by a corresponding sequence of acoustic frames. Here, for each respective transcribed speech utterance in the set of transcribed speech utterances, the operations further include: generating, by a causal speech encoder of the encoder, a first higher order audio feature representation for a corresponding acoustic frame in the sequence of acoustic frames representing the transcribed speech utterance at each of the plurality of output steps; receiving, as input to the first-pass decoder, the first higher order audio feature representation generated by the causal speech encoder at each of the plurality of output steps; and generating, by the first-pass decoder, a first probability distribution over possible speech recognition hypotheses at each of the plurality of output steps. In these examples, training the encoder is further based on the first probability distribution over possible speech recognition hypotheses generated by the first-pass decoder at each of the plurality of output steps for each respective transcribed speech utterance in the set of transcribed speech utterances. The causal speech encoder may include one of a plurality of unidirectional long short-term memory (LSTM) layers, a plurality of conformer layers, or a plurality of transformer layers. Alternatively, the causal speech encoder may include an initial stack of conformer layers and the non-causal audio-text encoder includes a final stack of conformer layers overlain on the initial stack of conformer layers.

In some implementations, the causal speech encoder and the non-causal audio-text encoder of the encoder are trained using Hybrid Autoregressive Transducer Factorization. Here, for each respective transcribed speech utterance in the set of transcribed speech utterances, the operations may further include: receiving, as input to the non-causal audio-text encoder, the first higher order audio feature representation generated by the causal speech encoder at each of the plurality of output steps; generating, by the non-causal audio-text encoder, a second higher order audio feature representation for a corresponding first higher order audio feature representation; receiving, as input to the second-pass decoder, the second higher order audio feature representation generated by the non-causal audio-text encoder at each of the plurality of output steps; and generating, by the second-pass decoder, a second probability distribution over possible speech recognition hypotheses at each of the plurality of output steps. Here, training the encoder is further based on the second probability distribution over possible speech recognition hypotheses generated by the second-pass decoder at each of the plurality of output steps for each respective transcribed speech utterance in the set of transcribed speech utterances. In these implementations, training the encoder model may include training the encoder using a minimum word error loss function.

Each sub-word unit in the sequence of sub-word units may include a phoneme or a wordpiece and each text unit in the first probability distribution over possible text units includes a wordpiece. In some implementations, for each respective unspoken textual utterance in the set of unspoken textual utterances, the operations further include, upsampling, using a parameter-free duration model, a distribution of the sequence of sub-word units tokenized from the respective unspoken textual utterance and randomly masking a portion of the upsampled distribution of the sequence sub-word units.

Another aspect of the disclosure provides a system that includes data processing hardware and memory hardware storing instructions that when executed on the data processing hardware causes the data processing hardware to perform operations. The operations include receiving training data that includes a set of unspoken textual utterances. Here, each respective unspoken textural utterance in the set of unspoken textual utterances is not paired with any corresponding spoken utterance of speech. For each respective unspoken textual utterance in the set of unspoken textual utterances the operations include: tokenizing the respective unspoken textual utterance into a sequence of sub-word units; generating, by a text encoder of an encoder, a first higher order textual feature representation for a corresponding sub-word unit in the sequence of sub-word units tokenized from the respective unspoken textual utterance at each of a plurality of output steps; receiving, as input to a first-pass decoder, the first higher order textual feature representation generated by the text encoder at each of the plurality of output steps; and generating, by the first-pass decoder, a first probability distribution over possible text units at each of the plurality of output steps. The operations also include training the encoder based on the first probability distribution over possible text units generated by the first-pass decoder at each of the plurality of output steps for each respective unspoken textual utterance in the set of unspoken textual utterances.

Implementations of the disclosure may include one or more of the following optional features. In some implementations, the operations further include, for each respective unspoken textual utterance in the set of unspoken textual utterances: receiving, as input to a non-causal audio-text encoder of the encoder, the first higher order textual feature representation generated by the text encoder at each of the plurality of output steps; generating, by the non-causal audio-text encoder, a second higher order textual feature representation for a corresponding first higher order textual feature representation; receiving, as input to a second-pass decoder, the second higher order textual feature representation generated by the non-causal audio-text encoder at each of the plurality of output steps; and generating, by the second decoder, a second probability distribution over possible text units at each of the plurality of output steps. Here, training the encoder model is further based on the second probability distribution over possible text units generated by the second-pass decoder at each of the plurality of output steps for each respective unspoken textual utterance in the set of unspoken textual utterances. In these implementations, the first-pass decoder and the second-pass decoder may include the same decoder. The non-causal audio-text encoder may include one of a plurality of unidirectional long short-term memory (LSTM) layers, a plurality of conformer layers, or a plurality of transformer layers.

In some examples, the training data further includes a set of transcribed speech utterances where each transcribed speech utterance in the set of transcribed speech utterances is paired with a corresponding transcription and represented by a corresponding sequence of acoustic frames. Here, for each respective transcribed speech utterance in the set of transcribed speech utterances, the operations further include: generating, by a causal speech encoder of the encoder, a first higher order audio feature representation for a corresponding acoustic frame in the sequence of acoustic frames representing the transcribed speech utterance at each of the plurality of output steps; receiving, as input to the first-pass decoder, the first higher order audio feature representation generated by the causal speech encoder at each of the plurality of output steps; and generating, by the first-pass decoder, a first probability distribution over possible speech recognition hypotheses at each of the plurality of output steps. In these examples, training the encoder is further based on the first probability distribution over possible speech recognition hypotheses generated by the first-pass decoder at each of the plurality of output steps for each respective transcribed speech utterance in the set of transcribed speech utterances. The causal speech encoder may include one of a plurality of unidirectional long short-term memory (LSTM) layers, a plurality of conformer layers, or a plurality of transformer layers. Alternatively, the causal speech encoder may include an initial stack of conformer layers and the non-causal audio-text encoder includes a final stack of conformer layers overlain on the initial stack of conformer layers.

In some implementations, the causal speech encoder and the non-causal audio-text encoder of the encoder are trained using Hybrid Autoregressive Transducer Factorization. Here, for each respective transcribed speech utterance in the set of transcribed speech utterances, the operations may further include: receiving, as input to the non-causal audio-text encoder, the first higher order audio feature representation generated by the causal speech encoder at each of the plurality of output steps; generating, by the non-causal audio-text encoder, a second higher order audio feature representation for a corresponding first higher order audio feature representation; receiving, as input to the second-pass decoder, the second higher order audio feature representation generated by the non-causal audio-text encoder at each of the plurality of output steps; and generating, by the second-pass decoder, a second probability distribution over possible speech recognition hypotheses at each of the plurality of output steps. Here, training the encoder is further based on the second probability distribution over possible speech recognition hypotheses generated by the second-pass decoder at each of the plurality of output steps for each respective transcribed speech utterance in the set of transcribed speech utterances. In these implementations, training the encoder model may include training the encoder using a minimum word error loss function.

Each sub-word unit in the sequence of sub-word units may include a phoneme or a wordpiece and each text unit in the first probability distribution over possible text units includes a wordpiece. In some implementations, for each respective unspoken textual utterance in the set of unspoken textual utterances, the operations further include, upsampling, using a parameter-free duration model, a distribution of the sequence of sub-word units tokenized from the respective unspoken textual utterance and randomly masking a portion of the upsampled distribution of the sequence sub-word units.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
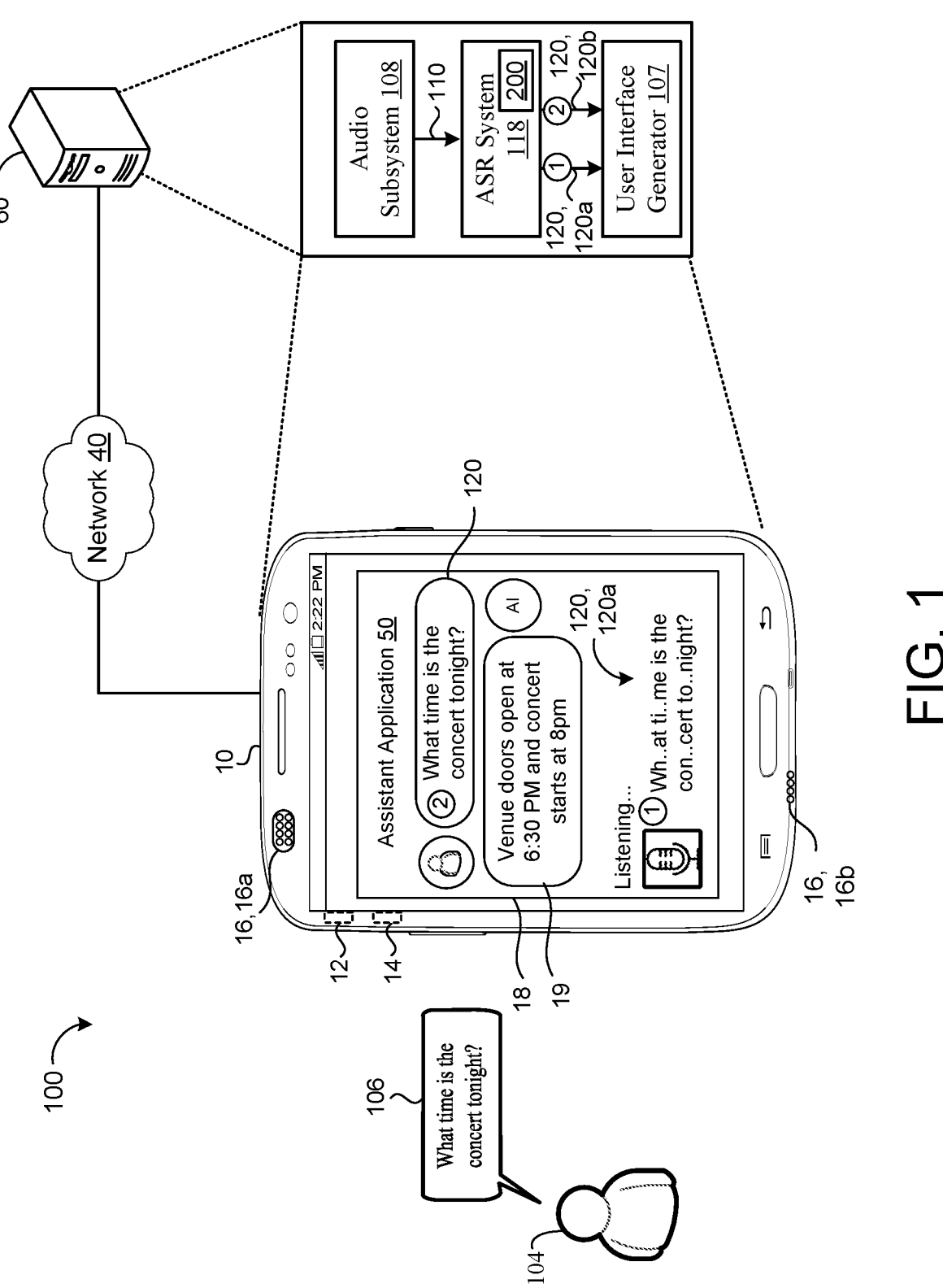
FIG. 1 is a schematic view of an example speech recognition system.

Automated speech recognition has made tremendous strides with the introduction of sequence to sequence (Seq2Seq) models that map from audio to character sequences. At the same time, text-to-speech (TTS) or speech synthesis systems have successfully applied Seq2Seq models to obtain state of the art natural, realistic sounding synthesized speech that can be indistinguishable to the human ear from human speech.

One challenge in developing deep learning-based ASR models is that parameters of the ASR models tend to over fit the training data, thereby resulting in the ASR models having difficulties generalizing unseen data when the training data is not extensive enough. Thus, training ASR models on larger training datasets improves the accuracy of the ASR model. For instance, the use of machine learning or other statistical methods can train ASR models on training data sets that include upwards of 10,000 hours of transcribed speech. Yet, performance of ASR models suffers when a domain associated with the training data is distinct from a domain at which the ASR model will be deployed during inference. For example, training an ASR model on transcribed speech in a domain associated with video meetings would be less effective in recognizing speech related to voice search queries, and vice versa.

Unpaired text data has the potential to drastically limit the amount of labeled human speech required to train ASR models, while also providing flexibility in moving the ASR model across different domains. Using text data (i.e., unpaired text data) in addition to speech data to train ASR models, however, presents a challenge with combining speech and text modalities of the training data. One current approach uses multi-task training to train a single model with different objectives for each modality. This approach suffers from interference and capacity limitations given the different nature and objectives for each modality of the training data. Another current approach includes TTS systems that synthesize unpaired text data to generate synthesized speech (i.e., modality conversion). Yet, using synthesized speech based on text data to train ASR models has shown to impact ASR training differently than human speech, despite instances of state of the art synthesized speech being indistinguishable from human speech. This gap between synthesized speech and human speech is attributed to mismatches in the synthesized speech data from the human speech data that arise from the difficult one-to-many mapping problem that TTS systems are trying to solve. Namely, while the aggregate quality of available synthesized speech is very high, the synthesized speech exhibits much less variation than human speech, as well as minimal speech disfluencies. As a result, using synthesized speech based on unpaired text data to train ASR models presents a difficulty for generalizing real speech utterances during inference. Moreover, using synthetized speech for unpaired text data also fails to consider ASR models that are trained to operate in a streaming fashion, namely, outputting transcriptions as soon as input audio data is received.

Accordingly, implementations herein are directed towards methods and systems of a joint speech and text streaming model for ASR. In particular, a training process obtains training data including a set of unspoken textual utterances each not paired with any corresponding spoken utterance of speech (e.g., human speech or synthetic speech). For each respective unspoken textual utterance, the training process tokenizes the respective unspoken textual utterance into a sequence of sub-word units (e.g., alignment output), generates a first higher order textual feature representation for a corresponding sub-word unit using a text encoder of an encoder of a speech recognition model, and generates a first probability distribution over possible text units using a first-pass decoder. The training process trains the encoder (e.g., encoder of a speech recognition model) based on the first probability distribution over possible text units generated by the first-pass decoder. As will become apparent, the encoder of the speech recognition model operates in both a streaming and non-streaming fashion during the training process such that the encoder trains on losses derived during streaming and non-streaming. Moreover, the training process may train the encoder using training data that includes a set of transcribed speech utterances each paired with a corresponding transcription. Thus, leveraging the unspoken textual utterances and the transcribed speech utterances the training process is able to train the encoder of the speech recognition model using shared latent representations of speech and text modalities.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 with the speech environment 100 into electrical signals and a speech output device (e.g., a speaker) 16, 16b for communicating with an audible audio signal (e.g., as output data from the user device 10). While the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 implements an ASR model 200 and resides on the user device 10 of the user 104 and/or on a remote computing device 60 (e.g., one or more remote servers of a distributed system executing in a cloud-computing environment) in communication with the user device 10 via a network 40. In some examples, the ASR model 200 may be a recurrent neural network-transducer (RNN-T) model. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model receives (e.g., processes) each acoustic frame 110 in the sequence of acoustic frames 110.

In the example shown, the ASR model 200 may perform streaming speech recognition to produce an initial speech recognition result 120, 120b and generate a final speech recognition result 120, 120a by improving the initial speech recognition result 120b. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 performs additional processing on the final speech recognition result 120a whereby the final speech recognition result 120a may be delayed from the initial speech recognition result 120b.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120b in a streaming fashion during time 1 and subsequently display the final speech recognition results 120a in a streaming fashion during time 2. Notably, the ASR model 200 outputs the final speech recognition results 120a in a streaming fashion even though the final speech recognition results 120a improve upon the initial speech recognition result 120b. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120b. During time 1, the user interface generator 107 presents, via the digital assistant interface 18, a representation of the initial speech recognition results 120b of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition results 120a of the utterance 106 to the user 104 of the user device 10 a streaming fashion such that words, word pieces, and/or individual characters appear on the screen as soon as they are generated by the ASR model 200. In some implementations, the user interface generator 107 replaces the representation of the initial speech recognition results 120b presented at time 1 with the representation of the final speech recognition results 120a presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120*b* at an earlier time than the final speech recognition results 120*a*. For instance, as the final speech recognition result 120*a* is presumed to be more accurate than the initial speech recognition result 120*b*, the final speech recognition result 120*a* ultimately displayed as the transcription 120 may fix any terms that may have been misrecognized in the initial speech recognition results 120*b*. In this example, the streaming initial speech recognition results 120*b* output by the ASR model 200 are displayed on the screen of the user device 10 at time 1 are associated with low latency and provide responsiveness to the user 104 that his/her query is being processed, while the final speech recognition result 120*a* output by the ASR model 200 and displayed on the screen at time 2 leverages an additional speech recognition model and/or a language model to improve the speech recognition quality in terms of accuracy, but at increased latency. However, since the initial speech recognition results 120*b* are displayed as the user speaks the utterance 106, the higher latency associated with producing, and ultimately displaying the final speech recognition results 120*a* is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120*b* and/or the final speech recognition result 120*a*) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
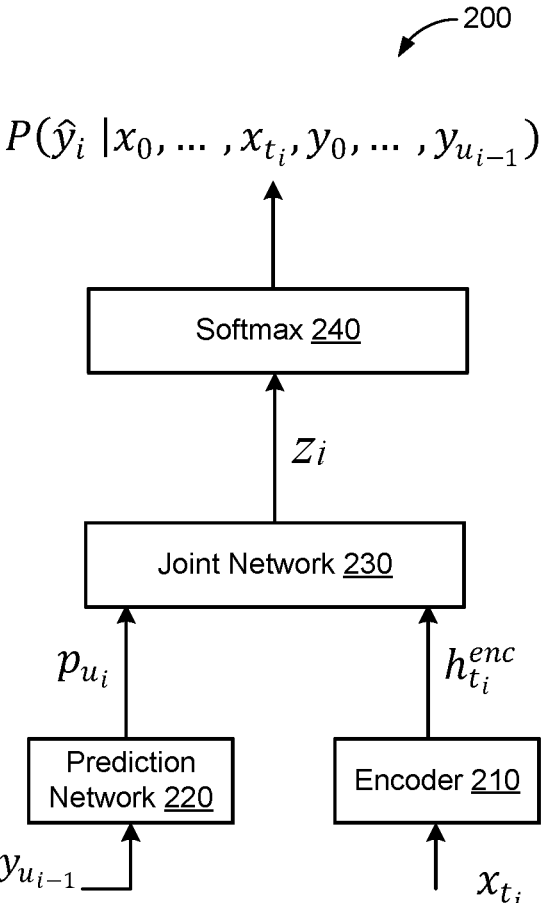
FIG. 2 is a schematic view of an example speech recognition model.

Referring to FIG. 2, an example ASR model 200 includes a Recurrent Neural Network-Transducer (RNN-T) model architecture which adheres to latency constraints associated with interactive applications. The use of the RNN-T model architecture is exemplary, and the ASR model 200 may include other architectures such as transformer-transducer and conformer-transducer model architectures among others. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder reads a sequence of d-dimensional feature vectors (e.g., acoustic frames 110 (FIG. 1)) x=(x₁, $x_2, \ldots, x_T$), where $x_t \in \mathbb{R}_d$, and produces at each output step a higher-order feature representation. This higher-order feature representation is denoted as $$h_1^{enc}, \ldots, h_T^{enc}.$$

Similarly, the prediction network 220 is also an LSTM network, which, like a language model (LM), processes the sequence of non-blank symbols output by a final Softmax layer 240 so far, $y_0, \ldots, y_{ui-1}$, into a dense representation put. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network then predicts $P(y_i | x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces, phonemes, and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model to be employed in a streaming fashion.

In some examples, the encoder network (i.e., encoder) 210 of the RNN-T model 200 includes a stack of self-attention layers/blocks, such as conformer blocks. Here, each conformer block includes a series of multi-headed self-attention, depth wise convolution and feed-forward layers. The prediction network 220 may have two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The Softmax layer 240 may be composed of a unified word piece or grapheme set that is generated using all unique word pieces or graphemes in a plurality of training data sets.

Figure 3A:
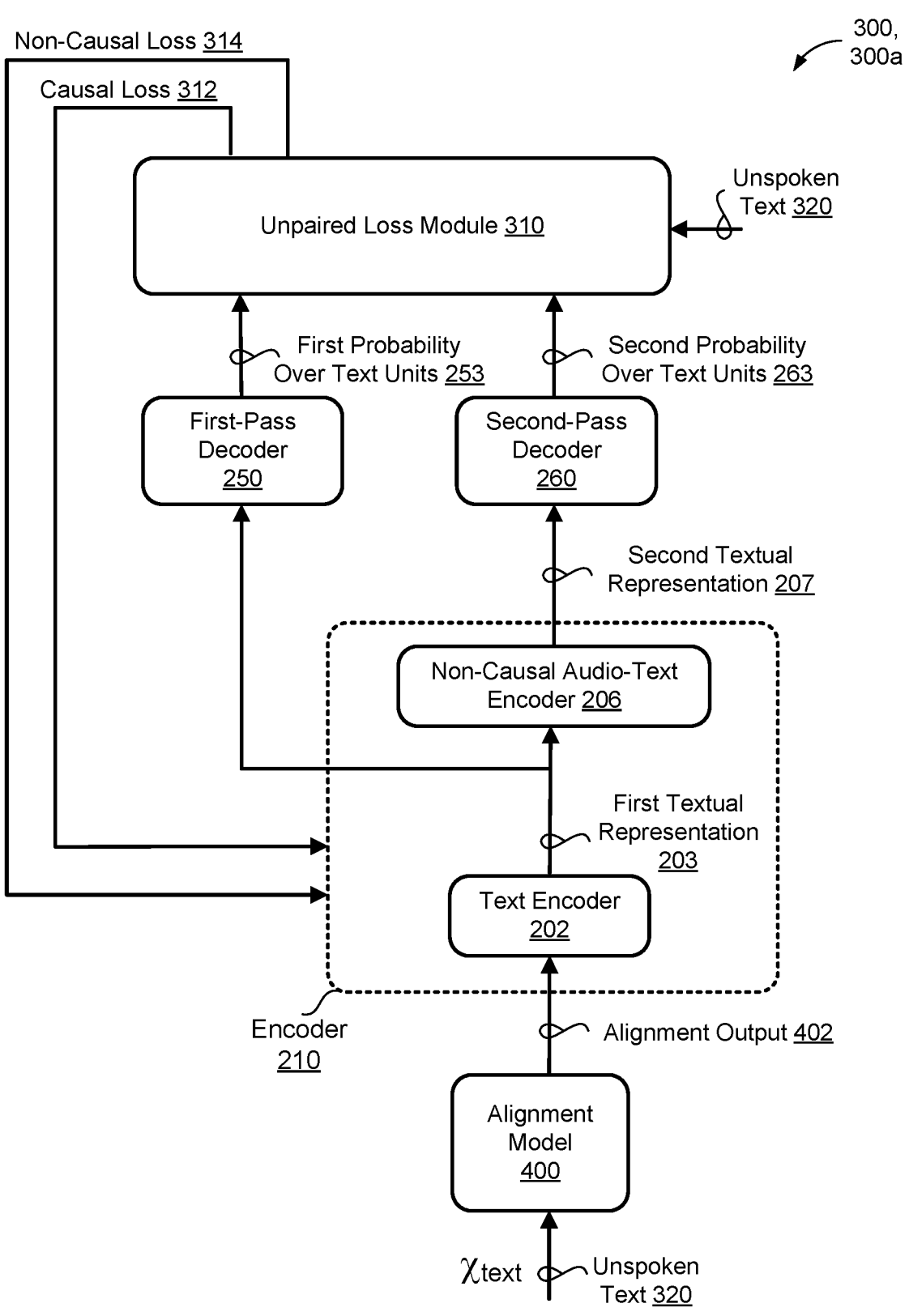
FIGS. 3A and 3B are schematic views of an example training process for training an encoder of the speech recognition model.
Figure 3B:
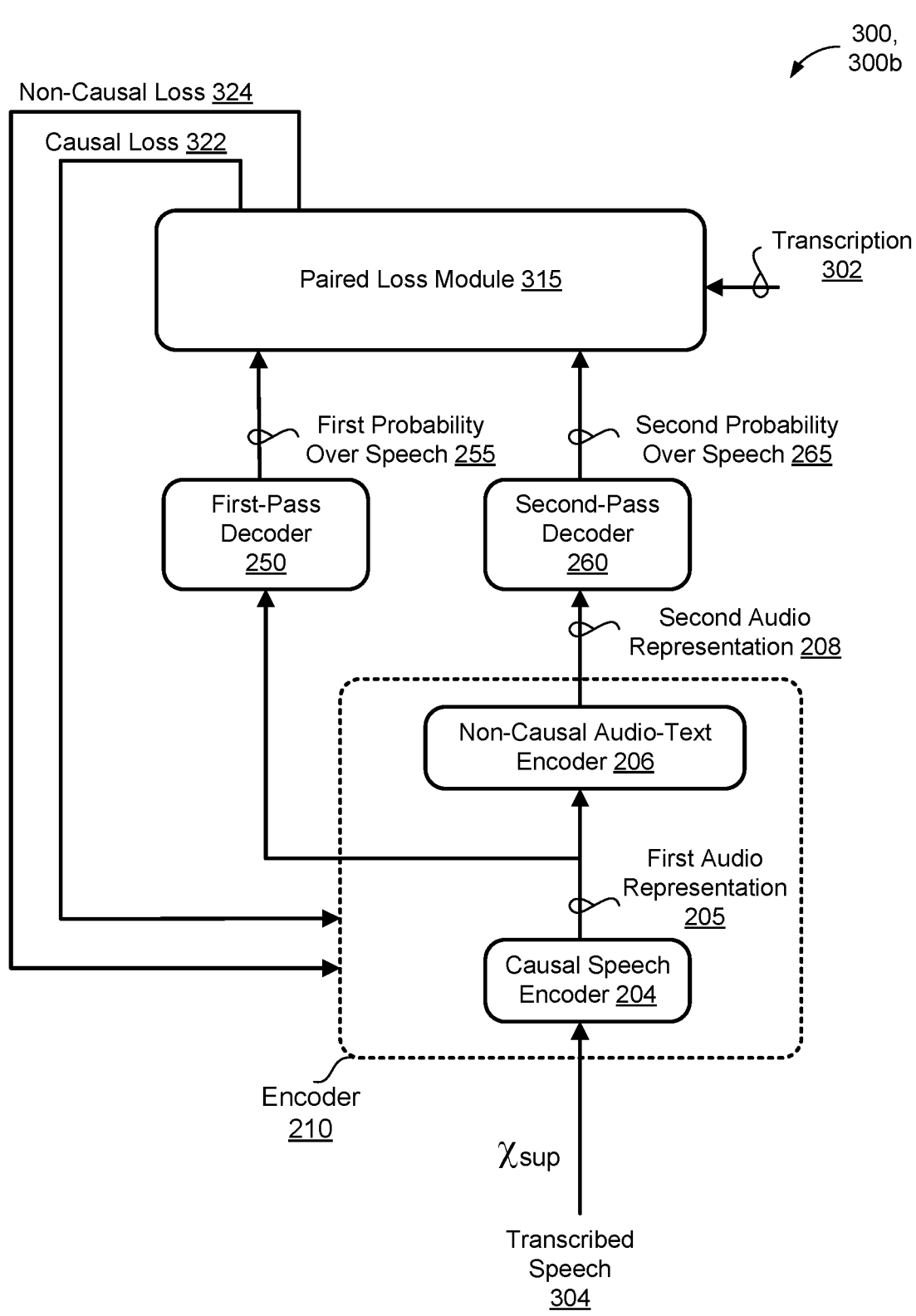

FIGS. 3A and 3B illustrate an example training process 300 for training the encoder 210 of the ASR model 200 (FIG. 2). The example training process 300 may be used to pre-train, train, and/or fine-tune train the encoder 210. The training process 300 trains the encoder 210 using available training data that includes a set of unspoken textual utterances ($X_{text}$) 320 and/or a set of transcribed non-synthetic speech utterances ($X_{sup}$) 304. Each unspoken textual utterance 320 includes text-only data (i.e., unpaired data) such that each unspoken textual utterance 320 is not paired with any corresponding spoken audio representation (i.e., speech) of the utterance. The unspoken textual utterance 320 may include any sequence text chunks including words, word-pieces, phonemes, and/or graphemes. Each transcribed non-synthetic speech utterance 304 (also referred to as simply "transcribed speech utterance 304") is paired with a corresponding transcription 302 and is represented by a corresponding sequence of acoustic frames 110 (FIG. 1).

For simplicity, the training process 300 includes a semi-supervised loss part 300, 300a (FIG. 3A) and a supervised loss part 300, 300b (FIG. 3B). As will become apparent, the training process 300 trains the encoder 210 based on a total loss including unpaired loss terms 312, 314 derived by the semi-supervised loss part 300a using the unspoken textual utterances 320 and paired loss terms 322, 324 derived by the supervised loss part 300b using the transcribed speech utterances 304. As will become apparent, both the semi-supervised loss part 300a and the supervised loss part 300b derive losses when the encoder 210 operates in the streaming fashion (e.g., unpaired causal loss term 312 and paired causal loss term 322) and the non-streaming fashion (e.g., unpaired non-causal loss term 314 and the paired non-causal loss term 324). The training process 300 may jointly train the encoder 210 using any combination of the unpaired loss terms 312, 314 and the paired loss terms 322, 324.

Referring now to FIG. 3A, the semi-supervised loss part 300a of the training process 300 may employ an alignment model 400 that is configured to generate, at each of a plurality of output steps, alignment outputs (i.e., textual representation) 402 for each of a plurality of unspoken training text utterances 320. The unspoken textual utterances 320 (also referred to as simply "unspoken textual utterance 320") includes unspoken text that is text-only data, i.e., unpaired data, such that each unspoken textual utterance ($X_{text}$) 320 is not paired with any synthesized or non-synthesized speech. Accordingly, the alignment model 400 generates a corresponding alignment output 402 for each of the unspoken textual utterances 320.

Figure 4:
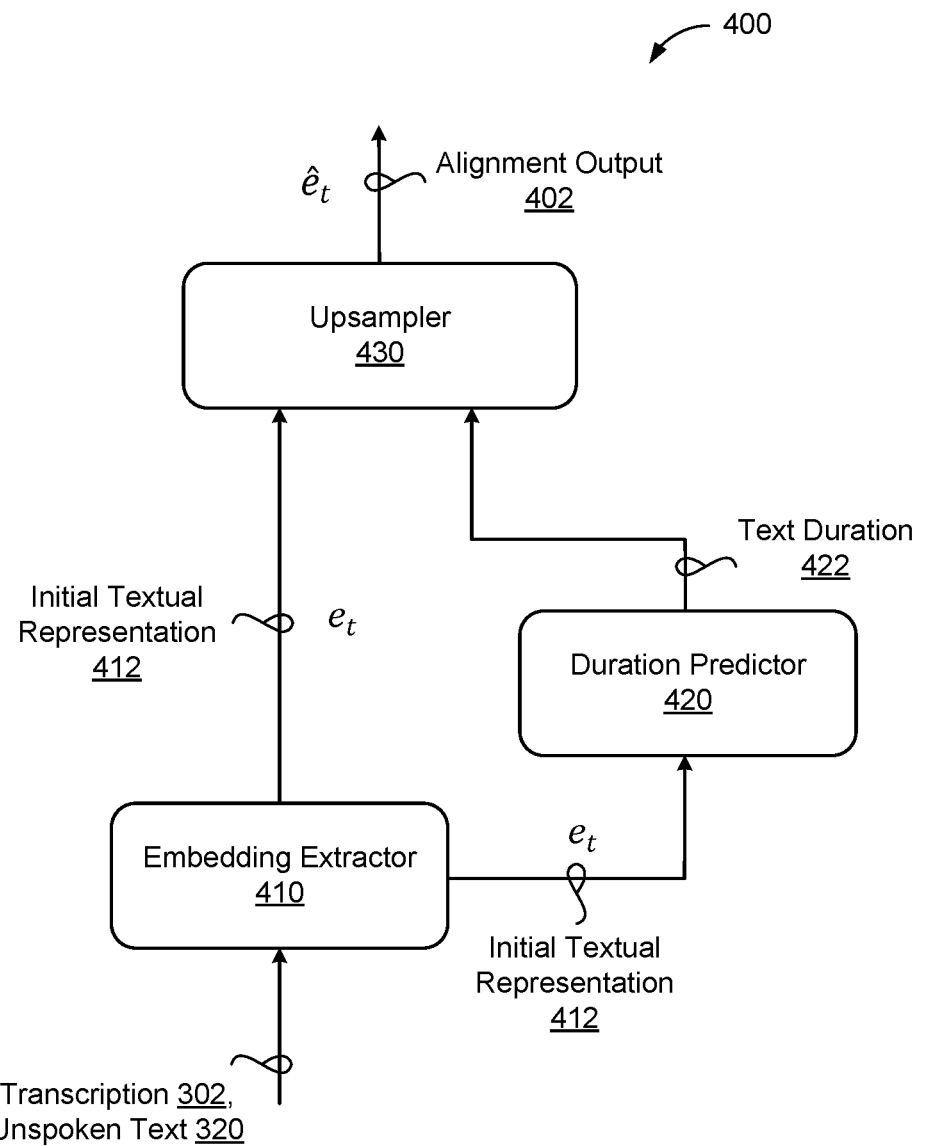
FIG. 4 is a schematic view of an example alignment model.

Referring now to FIG. 4, in some examples, the alignment model 400 is configured to tokenize the unspoken textual utterances 320 and/or the transcriptions 302 into a sequence of sub-word units (e.g., alignment outputs) 402. The alignment model 400 may include an embedding extractor 410, duration predictor 420, and an upsampler 430. The embedding extractor 410 receives the unspoken textual utterance 320 that includes a sequence of text chunks including words, wordpieces, phonemes, and/or graphemes and extracts a corresponding initial textual representation ($e_t$) 412. The initial textual representation 412 includes embedding lexical information from the unspoken textual utterance 320. Additionally or alternatively, the embedding extractor 410 may receive a transcription 302 corresponding to a transcribed speech utterance 304 (FIG. 3B). The duration predictor 420 receives the initial textual representation 412 from the embedding extractor 410 and predicts a corresponding text chunk duration (i.e., word, word-piece, phoneme, and/or grapheme duration) 422. The text chunk duration 422 indicates a duration the corresponding text chunk would be spoken if a human (or text-to-speech system) spoke the unspoken textual utterance 320 (or transcription 302). For example, the unspoken textual utterance 320 may include a sequence of phonemes and the duration predictor 420 predicts a phoneme duration 422 for each phoneme in the sequence of phonemes. In this example, the duration predictor 420 predicts the phoneme duration 422 by predicting a probability of non-zero duration for each phoneme and predicting a probability of continuous phoneme duration for each phoneme. As the sequence of phonemes includes regular phonemes, silences between word boundaries, and punctuation marks, only the regular phonemes are associated with non-zero duration while the silences and punctuation marks are generally associated with the continuous phoneme duration. Accordingly, the duration predictor 420 may use a sigmoid activation following a first one of two independent activations to predict the probability of non-zero duration and use a soft plus activation following a second one of the two independent projections to predict the continuous text chunk duration 422 for each text chunk. The duration predictor 420 determines, for each text chunk, whether the probability of non-zero duration is less than a threshold value, and when the probability of non-zero duration is less than the threshold value, a multiplier may zero-out the continuous text chunk duration 422 predicted by the softplus activation for the corresponding text chunk. Otherwise, when the probability of non-zero duration is not less than the threshold value, the predicted text chunk duration 422 may be set equal to the continuous phoneme duration predicted by the softplus activation.

The upsampler 430 receives, for each unspoken textual utterance 320, the corresponding initial textual representation 412 and the predicted text chunk duration 422, and generates an alignment output ($\hat{e}_t$) 402 having a number of frames by upsampling the initial textual representation 412 using the corresponding predicted text chunk duration 422. In some examples, the alignment model 400 sends the alignment output 402 to a text encoder 202 of the encoder 210 (FIG. 3A). In other examples (not shown), the alignment model 400 sends the alignment output 402 directly to the non-causal audio-text encoder 206 of the encoder 210 (FIG. 3A). In these other examples, the alignment output 402 serves as a first higher order textual feature representation 203 such that the non-causal audio-text encoder 206 may receive the alignment output 402 directly from the alignment model 400. In some additional examples, paired training data is available and the upsampler 430 generates the alignment output 402 as follows.

$$\hat{e}_t = \theta_{Refiner}(\text{Resample}(e_t, \text{Align}_{RNN-T}(e_s, t))) \qquad (1)$$

Here, the upsampler includes resampler and refiner layers that align the initial textual embedding 412 to align with a corresponding encoded audio representations directly. In yet other examples, paired training data is not available and the upsampler 430 generates the alignment output 402 as follows.

$$\hat{e}_t = \theta_{Refiner}(\text{Resample}(e_t, \theta_{duration}(e_t))) \qquad (2)$$

In particular, the number of frames of the alignment output 402 indicates a predicted speech duration of the unspoken textual utterance 320. Stated differently, the number of frames of the alignment output 402 maps (i.e., aligns) the sequence of text chunks of the unspoken textual utterance 320 to speech frames. Here, the upsampler 430 includes resampler and refiner layers that replicate the initial textual embedding 412 to match the predicted text chunk duration 422 (i.e., speech duration). As such, the alignment output 402 includes a textual representation of the unspoken textual utterance 320 having a timing component that aligns with how a human would speak the unspoken textual utterance 320.

Advantageously, the alignment model 400 includes a parameter-free duration model thereby greatly simplifying the training process 300 (FIGS. 3A and 3B). That is, instead of having parameters (e.g., neural network parameters) that are trained during training and consume memory and computational resources, the alignment model 400 is a parameter-free duration model saving memory and computational resources. In some implementations, the parameter-free alignment model 400 includes a fixed-repetition model. Here, the fixed-repetition model replicates each alignment output (e.g., sub-word unit) 402 a predetermined number of times. For instance, each alignment output 402 may include a predetermined repetition length of three (3), which corresponds to 180 milliseconds for each alignment output 402. Thus, in these instances, each alignment output 402 would have a speech duration corresponding to the predetermined repetition length, for example 180 milliseconds. In other implementations, the parameter-free alignment model 400 includes a random repetition model. Namely, the random repetition model replicates each alignment output 402 a random number of times. That is, the alignment model 400 may sample a respective repetition length from a distribution of repetition lengths for each respective alignment output 402, and apply the sampled repetition length to the respective alignment output 402. For example, a distribution of repetition lengths may include one repetition length (e.g., 60 milliseconds), two repetition lengths (e.g., 120 milliseconds), or three repetition lengths (e.g., 180 milliseconds). Continuing with the example, the alignment model 400 may sample a repetition length of one for a first alignment output 402 such that the first alignment output 402 has a speech duration of 60 milliseconds and sample a repetition length of three for a second alignment output 402 such that the second alignment output has a speech duration of 180 milliseconds. Using the distribution of repetition lengths, the alignment model 400 is able to better simulate the variability of spoken utterances in the alignment outputs 402.

In some examples, the parameter-free alignment model 400 includes a sub-word distribution model. In the sub-word distribution model, the alignment model 400 determines a distribution for each sub-word unit (e.g., alignment output 402). That is, for each transcribed speech utterance 304, the alignment model 400 generates forced-alignments using a baseline alignment model to estimate phoneme and word alignments for each word in the transcript from the transcribed speech utterance 304. The alignments are used to determine statistics of the number of frames corresponding to each phoneme or word in the transcribed speech utterances 304. As such, the alignment model 400 decomposes each word into its constituent word-pieces and evenly distributes a total number of frames amongst its constituent word-pieces. By accumulating statistics over all the transcribed speech utterances 304, the alignment model 400 determines a sufficient Gaussian distribution (e.g., including a mean and standard deviation) for each sub-word unit. As such, a duration for each sub-word unit may be derived by sampling from the corresponding Gaussian distribution or a Gaussian distribution that is sufficiently similar to the sub-word unit. Thus, the sub-word distribution model samples from Gaussian distribution models during inference to determine the alignment outputs 402. Notably, each unit is sampled independently agnostic to contextual effects because the sub-word distribution model is a parameter-free model.

In other examples, the parameter-free alignment model 400 includes an alignment sub-word distribution model. Here, the alignment model uses the text from the transcribed speech utterances 304 to augment the unpaired text data. In effect, this augmentation approach treats the text from the transcribed speech utterances 304 as unpaired text. Moreover, the alignment model up-samples the unspoken textual utterances 320 based on a ground-truth number of frames obtained using a forced-alignment. In particular, the alignment model 400 divides up a total number of frames from a word amongst constituent word-pieces. On the other hand, for unpaired text data (e.g., unspoken textual utterances 320), the alignment model 400 uses the sub-word distribution model to up-sample the text.

Thus, using any of the parameter-free duration models described above, the alignment model 400 upsamples a distribution of the sequence of sub-word units tokenized from the respective unspoken textual utterance 320 (or transcribed speech utterance 304) and randomly masks a portion of the upsampled distribution of the sequence of sub-word units. Here, masking the upsampled distribution (e.g., setting portions of the sub-word unit to a null value) masks the alignment outputs 402 such that the alignment outputs 402 are sufficiently difficult for use in the training process 300. Thus, in any of the parameter-free duration models employed by the alignment model 400, the non-use of parameters greatly simplifies the training process 300 (FIGS. 3A and 3B).

Notably, in most instances, a text-to-speech (TTS) system generates an audible output to give the unspoken textual utterance 320 the timing component of human speech such that a training process may use the audible output (i.e., synthetic speech) to train the encoder 210. Thus, since alignment model 400 generates the alignment output 402 that maps the sequence of text chunks to speech frames directly, the training process 300 does not require any TTS system to train the encoder 210 using unspoken textual utterances 320. That is, the alignment model 400 does not convert the unspoken textual utterance 320 to generate synthetic speech which, as discussed above, may not accurately model human speech for training speech recognition models.

Referring back to FIG. 3A, the semi-supervised loss part 300a of the training process 300 is configured to inject lexical information into the encoder 210 during training based on the unpaired causal loss term 312 and the unpaired non-causal loss term 314 each derived from the alignment outputs 402 corresponding to unspoken textual utterances 320 output by the alignment model 400. To that end, in some examples, the encoder 210 of the ASR model 200 (FIG. 2) includes a text encoder 202 and a non-causal audio-text encoder 206. Optionally, the text encoder 202 may only be used during the training process 300 and not during inference of the ASR model 200. The text encoder 202 may be a causal text encoder that does not receive any additional right-context (e.g., no additional frames of alignment output 402). In particular, the text encoder 202 is configured to receive alignment outputs 402 (i.e., text embeddings) from the alignment model 400 and generate, at each of a plurality of output steps, a first higher order textual feature representations 203 for a corresponding alignment output 402 (e.g., corresponding to an unspoken textual utterance 320). That is, the text encoder 202 operates in a streaming fashion such that, at each output step, the text encoder 202 outputs the first higher order textual feature representations 203 as soon as they are generated. Thus, the first higher order textual feature representations 203 may correspond to a portion of the alignment output 402 or an entirety of the alignment output 402.

The semi-supervised loss part 300a of the training process 300 employs a first-pass decoder 250 of the ASR model 200 (FIG. 2) configured to receive, as input, the first higher order textual feature representations 203 output from the text encoder 202 at each of the plurality of output steps and generate, as output, a first probability distribution 253 over possible text units for a corresponding first higher order textual feature representation 203. Here, each text unit from the first probability distribution 253 may include a word-piece. In some implementations, the first-pass decoder 250 includes a RNN-T architecture. The first-pass decoder 250 may include a phoneme decoder configured to decode a sequence of phonemes, a wordpiece decoder configured to decode a sequence of word pieces, and/or a grapheme decoder configured to decode a sequence of graphemes. In some examples, the first probability distribution 253 over possible text units includes one of possible text labels, possible phoneme labels, possible wordpiece labels, or possible grapheme labels. An unpaired loss module 310 is configured to determine the unpaired causal loss term 312 based on the first probability distribution 253 over possible text units and the corresponding unspoken textual utterance 320. The unpaired causal loss term 312 may be represented by $\mathcal{L}_C(y_t, x_t)$ where $y_t$ represents the first probability distribution 253 over possible text units and $x_t$ represents the unspoken textual utterance 320. Here, the corresponding unspoken textual utterance 320 in which the first probability distribution 253 over possible text units is generated from, serves as a ground-truth transcription when determining the unpaired causal loss term 312 for the corresponding unspoken textual utterance 320.

With continued reference to FIG. 3A, the encoder 210 includes the non-causal audio-text encoder 206 configured to generate a second higher order textual feature representation 207 for a corresponding first higher order textual feature representation 203. As will become apparent, the non-causal audio-text encoder 206 generates higher order feature representations for text and audio encodings such that the training process 300 trains the encoder 210 using shared latent representations including speech and text modalities. The non-causal audio-text encoder 206 may include one of a plurality of unidirectional long short-term memory (LSTM) layers, a plurality of conformer layers, or a plurality of transformer layers. Notably, the non-causal audio-text encoder 206 operates in a non-streaming fashion such that the non-causal audio-text encoder 206 processes additional right context to generate the second higher order textual feature representations 207. That is, in contrast to the text encoder 202, the non-causal audio-text encoder 206 receives additional right context (e.g., additional frames of the alignment output 402) and generates the second higher order textual feature representation 207 by processing the additional right context. In some examples, the non-causal audio-text encoder 206 generates the second higher order textual feature representation 207 without receiving any alignment outputs 402 or audio data as input. In these examples, the non-causal audio-text encoder 206 only receives the first higher order textual feature representation 203 generated by the text encoder 202 at each of the plurality of output steps whereby the first higher order textual feature representations 203 represent the additional right context (e.g., 900 ms of additional right context frames). Accordingly, by processing the first higher order textual feature representation 203 corresponding to additional right context, the non-causal audio-text encoder 206 generates the second higher order textual feature representation 207 with more accuracy, but at the cost of increased latency.

The semi-supervised loss part 300a of the training process 300 includes the second-pass decoder 260 of the ASR model 200 (FIG. 2) configured to receive, as input, the second higher order textual feature representations 207 output by the non-causal audio-text encoder 206 and generate, as output, a second probability distribution 263 over possible text units for a corresponding second higher order textual feature representation 207. Here, each text unit from the first probability distribution 253 may include a wordpiece. In some examples, the first-pass decoder 250 and the second-pass decoder are the same decoder. In some implementations, the second-pass decoder 260 includes a RNN-T architecture. The second-pass decoder 260 may include a phoneme decoder configured to decode a sequence of phonemes, a wordpiece decoder configured to decode a sequence of word pieces, and/or a grapheme decoder configured to decode a sequence of graphemes. In some examples, the first probability distribution 253 over possible text units includes one of possible text labels, possible phoneme labels, possible wordpiece labels, or possible grapheme labels. Thus, the unpaired loss module 310 is further configured to determine the unpaired non-causal loss term 314 based on the second probability distribution 263 over possible text units and the corresponding unspoken textual utterance 320. The unpaired causal loss term 312 may be represented by $\mathcal{L}_{NC}(y_t, x_t)$ where $y_t$ represents the second probability distribution 263 over possible text units and $x_t$ represents the unspoken textual utterance 320. Here, the corresponding unspoken textual utterance 320 in which the second probability distribution 263 over possible text units was generated from, serves as a ground-truth transcription for determining the unpaired non-causal loss term 314 for the corresponding unspoken textual utterance 320.

Thus, the semi-supervised loss part 300a of the training process 300 trains the encoder 210 of the ASR model 200 (FIG. 2) based on the unpaired loss terms 312, 314 derived from the unspoken textual utterances 320. Training the encoder 210 may include updating parameters of the text encoder 202 and/or the non-causal audio-text encoder 206 based on the unpaired loss terms 312, 314. Notably, the unpaired causal loss term 312 indicates a loss when the encoder 210 operates in the streaming fashion for the unspoken textual utterances 320 and the unpaired non-causal loss term 314 indicates a loss when the encoder 210 operates in the non-streaming fashion for the unspoken textual utterances 320. As such, the encoder 210 is jointly trained on the unpaired losses 312, 314 when the encoder 210 operates in the streaming and non-streaming modes.

Referring now to FIG. 3B, the supervised loss part 300*b* of the training process 300 is configured to inject lexical information into the encoder 210 during training based on an paired causal loss term 322 and a paired non-causal loss term 324 each derived from a corresponding transcribed speech utterance 304. In some examples, the encoder 210 includes a causal speech encoder 204 and the non-causal audio-text encoder 206 in addition to, or in lieu of, the text encoder 202 (FIG. 3A). In some examples, the causal speech encoder 204 includes one of a plurality of unidirectional long short-term memory (LSTM) layers, a plurality of conformer layers, or a plurality of transformer layers. In these examples, the causal speech encoder 204 may include an initial stack of conformer layers and the non-causal audio-text encoder includes a final stack of conformer layers overlain on the initial stack of conformer layers. The causal speech encoder 204 does not receive any additional right context (e.g., no additional frames of the transcribed speech utterance 304). In particular, the causal speech encoder 204 is configured to receive the transcribed speech utterances 304 and generate, at each of the plurality of output steps, a first higher order audio feature representation 205. That is, the causal speech encoder 204 operates in a streaming fashion such that, at each output step, the causal speech encoder 204 outputs the first higher order audio feature representations 205 as soon as they are generated. As such, the first higher order audio feature representation 205 may correspond to a portion of the transcribed speech utterance 304 or an entirety of the transcribed speech utterance 304.

The supervised loss part 300*b* of the training process 300 employs the first-pass decoder 250 and the second-pass decoder 260. The first-pass decoder 250 is configured to receive, as input, the first higher order audio feature representation 205 output from the causal speech encoder 204 at each of the plurality output steps and generate, as output, a first probability distribution 255 over possible speech recognition hypotheses. In some implementations, the first-pass decoder 250 includes a RNN-T architecture. The first-pass decoder 250 may include a phoneme decoder configured to decode a sequence of phonemes, a wordpiece decoder configured to decode a sequence of word pieces, and/or a grapheme decoder configured to decode a sequence of graphemes. In some examples, the first probability distribution 255 over possible speech recognition hypotheses includes one of possible phoneme labels, possible wordpiece labels, or possible grapheme labels. Thereafter, a paired loss module 315 is configured to determine the paired causal loss term 322 based on the first probability distribution 255 over possible speech recognition hypotheses and the transcription 302 for the corresponding transcribed speech utterance 304. The paired causal loss term 322 may be represented by $\mathcal{L}_C(y_s, x_s)$ where $y_s$ represents the first probability distribution 255 over possible speech recognition hypotheses and $x_s$ represents transcribed speech utterance 304. Here, the transcription 302 paired with the corresponding transcribed speech utterance 304 in which the first probability distribution 255 over possible speech recognition hypotheses is generated from serves as a ground-truth transcription when determining the paired causal loss term 322 for the corresponding transcribed speech utterance 304.

With continued reference to FIG. 3B, the encoder 210 includes the non-causal audio-text encoder 206 configured to generate a second higher order audio feature representation 208 for a corresponding first higher order audio feature representation 205. That is, in contrast to the causal speech encoder 204, the non-causal audio-text encoder 206 receives additional right context (e.g., additional acoustic frames corresponding to the transcribed speech utterance 304) and generates the second higher order textual feature representation 207 by processing the additional right context. In some examples, the non-causal audio-text encoder 206 generates the second higher order audio feature representation 208 without receiving any additional transcribed speech utterances 304 or future acoustic frames. In these examples, the non-causal audio-text encoder 206 only receives the first higher order audio feature representation 205 generated by the causal speech encoder 204 at each of the plurality of output steps whereby the first higher order audio feature representations 205 represent the additional right context (e.g., 900 ms of additional right context frames). Accordingly, by processing the first higher order audio feature representation 205 corresponding to additional right context, the non-causal audio-text encoder 206 generates the second higher order audio feature representation 208 with more accuracy, but at the cost of increased latency.

The supervised loss part 300*b* of the training process 300 includes the second-pass decoder 260 of the ASR model 200 (FIG. 2) configured to receive, as input, the second higher order audio feature representations 208 output by the non-causal audio-text encoder 206 and generate, as output, a second probability distribution 265 over possible speech recognition hypotheses for a corresponding second higher order audio feature representation 208. In some implementations, the second-pass decoder 260 includes a RNN-T architecture. The second-pass decoder 260 may include a phoneme decoder configured to decode a sequence of phonemes, a wordpiece decoder configured to decode a sequence of word pieces, and/or a grapheme decoder configured to decode a sequence of graphemes. In some examples, the second probability distribution 265 over possible speech recognition hypotheses includes one of possible phoneme labels, possible wordpiece labels, or possible grapheme labels. Thus, the paired loss module 310 is further configured to determine the paired non-causal loss term 324 based on the second probability distribution 265 over possible speech recognition hypotheses and the transcription 302 of the corresponding transcribed speech utterance 304. The paired non-causal loss term 324 may be represented by $\mathcal{L}_{NC}(y_s, x_s)$ where $y_s$ represents the second probability distribution 265 over possible speech recognition hypotheses and $x_t$ represents the transcribed speech utterance 304. Here, the transcription 302 of the corresponding transcribed speech utterance 304 from which second probability distribution 265 over possible speech recognition hypotheses was generated from, serves as a ground-truth transcription when determining the paired non-causal loss term 324 for the corresponding transcribed speech utterance 304.

Thus, the supervised loss part 300*b* of the training process 300 trains the encoder 210 of the ASR model 200 (FIG. 2) based on the paired loss terms 322, 324 derived from the transcribed speech utterances 304. Training the encoder 210 may include updating parameters of the causal speech encoder 204 and/or the non-causal audio-text encoder 206 based on the paired loss terms 322, 324. In some examples, the training process 300 trains the causal speech encoder 204 and the non-causal audio-text encoder 206 using Hybrid Autoregressive Transducer Factorization. Notably, the paired causal loss term 322 indicates a loss when the encoder 210 operates in the streaming fashion for transcribed speech utterances 304 and the paired non-causal loss term 324 indicates a loss when the encoder 210 operates in the non-streaming fashion for the transcribed speech utterances 304. As such, the encoder 210 is jointly trained on the paired losses 322, 324 when the encoder 210 operates in the streaming and non-streaming modes.

Referring again to FIGS. 3A and 3B, the training process 300 trains the ASR model 200 (FIG. 2) by updating parameters of the ASR model 200 based on the unpaired losses 312, 314 and the paired losses 322, 324. More specifically, the training process 300 may train the encoder 210 of the ASR model 200 jointly based on the unpaired losses 312, 314 and the paired losses 322, 324. Advantageously, the joint training approach enables the training process 300 to train the encoder 210 based on the unpaired causal loss term 312 and the paired causal loss term 322 as the encoder 210 operates in the streaming fashion and based on the unpaired non-causal loss term 312 and the paired non-causal loss term 324 as the encoder 210 operates in the non-streaming fashion. Notably, the encoder 210 does not consider additional right context when the training process 300 determines the unpaired causal loss term 312 and the paired causal loss term 322. On the other hand, the encoder 210 does process additional right context when the training process 300 determines the unpaired non-causal loss term 314 and the paired non-causal loss term 324. Moreover, the training process 300 trains the encoder 210 using the unspoken textual utterances 320 and the transcribed speech utterances 304 whereby the encoder 210 is compatible with encodings in the text and speech modalities. In short, the training process 300 enables training in both the text and speech modalities using shared latent space representations between text and speech and enables training in both streaming and non-streaming fashions. Namely, the training process 300 may train the encoder 210 using an overall training loss according to:

$$\mathcal{L}_{CE} = \lambda_1[\mathcal{L}_C(y_s, x_s) + \mathcal{L}_{NC}(y_s, x_s)] + \lambda_2[\mathcal{L}_c(y_t, x_t) + \mathcal{L}_{NC}(y_t, x_t)] \quad (3)$$

In Equation 3, $\mathcal{L}_{CE}$ represents the overall training loss, $\lambda_1$ represents a weight corresponding to the paired loss terms 322, 324, and $\lambda_2$ represents a weight corresponding to the unpaired loss terms 312, 314. Moreover, in Equation 3 $\mathcal{L}_C(y,x)$ may be denoted as $-\log P_C(y|x)$ and $\mathcal{L}_{NC}(y,x)$ denoted as $-\log P_{NC}(y|x)$. In some implementations, the overall loss is determined over a mini-batch of training samples where each mini-batch includes one-half transcribed speech utterances 304 and one-half unspoken textual utterances 320.

In some implementations, the training process 300 trains the encoder 210 using a minimum word error rate (MWER) loss aiming to minimize a number of word errors. In particular, given a speech utterance (x), a corresponding ground-truth transcription (y*), and a set of N-best hypotheses ($y_i$) the MWER loss may be derived according to:

$$\mathcal{L}^{MWER}(y^*, x) = \sum_{y_i}\left[\frac{P(y_i \mid x)}{\sum_i P(y_i \mid x)}\right]\left[W(y_i, y^*) - \frac{\sum_i W(y_i, y^*)}{N}\right] \quad (4)$$

In Equation 4, $W(y_i, y^*)$ represents a number of word errors between the hypothesis (y) and the ground-truth transcription (y*). The training process 300 may incorporate the unspoken textual utterances 320 into the MWER loss according to:

$$\mathcal{L} = \lambda_1\left[\mathcal{L}_C^{MWER}(y_s, x_s) + \mathcal{L}_{NC}^{MWER}(y_s, x_s)\right] + \lambda_2\left[\mathcal{L}_c^{MWER}(y_t, x_r) + \mathcal{L}_{NC}^{MWER}(y_t, x_t)\right] + \alpha\mathcal{L}_{CE} \quad (5)$$

In Equation 5, $$\mathcal{L}_C^{MWER}$$

represents the MWER losses based on outputs of the first-pass decoder 250, $$\mathcal{L}_{NC}^{MWER}$$

represents the MWER losses based on outputs of the second-pass decoder 260, a represents an interpolation weight, and $\mathcal{L}_{CE}$ represents the overall loss from Equation 3.

Implementations described above describe the training process 300 training the encoder 210 of the ASR model 200, however, it is understood that the training process 300 may also be employed to train/pre-train a monolingual ASR model 200 or a multilingual ASR model 200. In some instances, the training process 300 may be employed to train end-to-end ASR models with decoder structures (i.e., non-pre-training) or fine-tune an ASR model to perform down-stream tasks such as speech translation or natural language understanding. Moreover, the training process 300 may be used with any training data source including unspoken textual utterances 320 and transcribed speech utterances 304, independently, or using some combination thereof.

Figure 5:
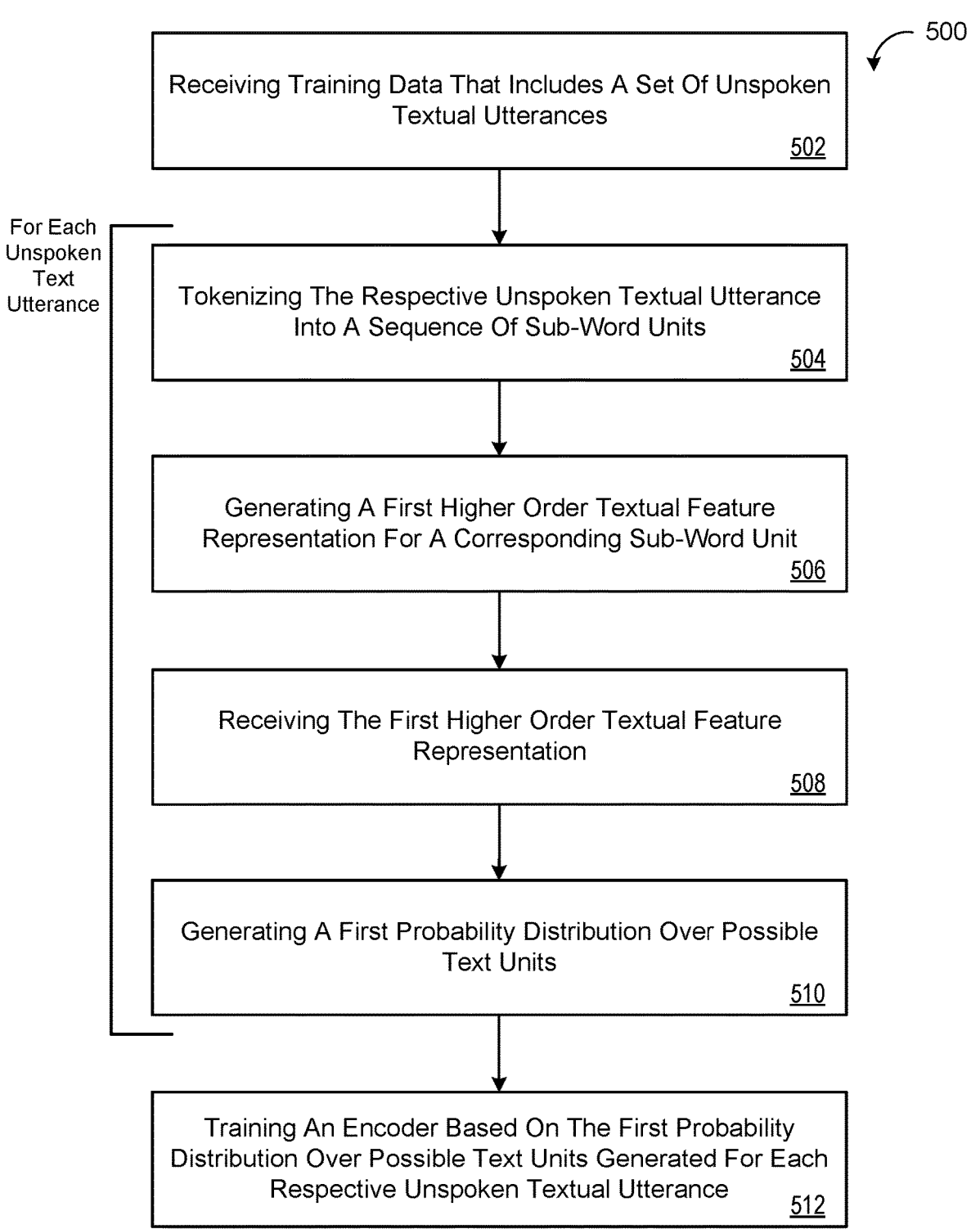
FIG. 5 is a flowchart of an example arrangement of operations for a computer-implemented method of training an encoder of a speech recognition model to jointly learn shared representations of speech and text.
Figure 6:
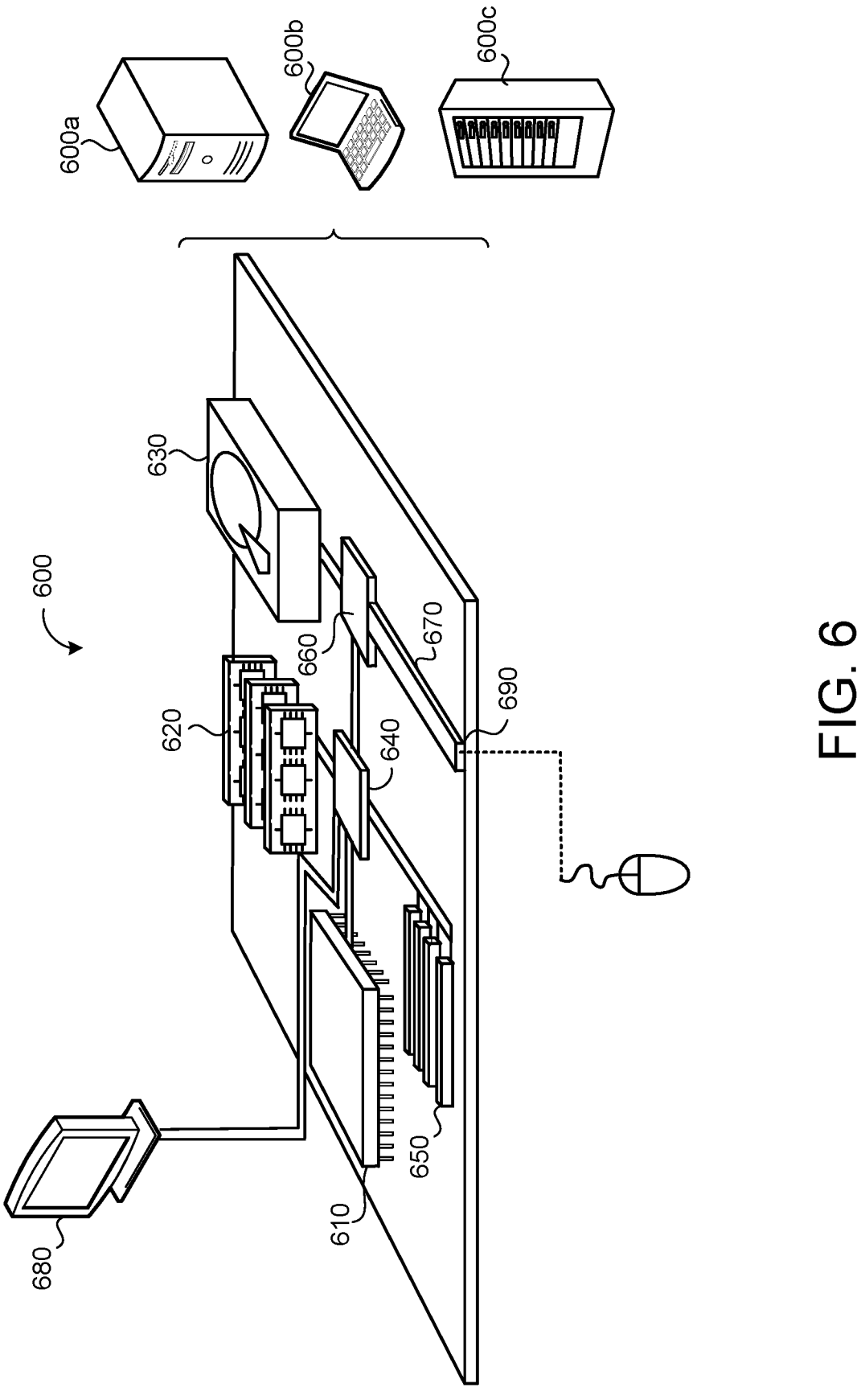
FIG. 6 is a schematic view of an example computing device that may be used to implement the systems and methods described herein.

FIG. 5 is a flowchart of an example arrangement of operations for a method 500 of pre-training the encoder 210 to jointly learn shared representations of speech and text. The method 500 may execute on data processing hardware 610 (FIG. 6) using instructions stored on memory hardware 620 (FIG. 6). The data processing hardware 610 and the memory hardware 620 may reside on the remote computer/server 60 of FIG. 1 corresponding to a computing device 600 (FIG. 6).

At operation 502, the method 500 includes receiving training data that includes a set of unspoken textual utterances 320. Here, each unspoken textual utterance 320 in the set of unspoken textual utterances is not paired with any corresponding spoken utterance of speech (e.g., either synthetic or non-synthetic/human speech). For each respective unspoken textual utterance 320 in the set of unspoken textual utterances 320, the method 500 performs operations 504-510. At operation 504, the method 500 includes tokenizing the respective unspoken textual utterance into a sequence of sub-word units (e.g., alignment outputs) 402. At operation 506, the method 500 includes generating, at each of a plurality of output steps, a first higher order textual feature representation 203 for a corresponding sub-word unit 402 in the sequence of sub-word units 402 tokenized form the respective unspoken textual utterance 320. Here, a text encoder 202 of the encoder 210 of the ASR model 200 generates the first higher order textual feature representation 203. At operation 508, the method 500 includes receiving the first higher order textual feature representation 203 generated by the text encoder 202 at each of the plurality of output steps as input to a first-pass decoder 250. At operation 510, the method 500 includes generating, by the first-pass decoder 250, a first probability distribution 253 over possible text units. At operation 512, the method 500 includes training the encoder 210 of the ASR model 200 based on the first probability distribution 253 over possible text units generated by the first-pass decoder 250 at each of the plurality of output steps for each respective textual utterance 320 in the set of unspoken textual utterances 320.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:

receiving training data comprising a set of unspoken textual utterances, each respective unspoken textual utterance in the set of unspoken textual utterances is not paired with any corresponding spoken utterance of speech;

for each respective unspoken textual utterance in the set of unspoken textual utterances:

tokenizing the respective unspoken textual utterance into a sequence of sub-word units;

generating, by a text encoder of an encoder, at each of a plurality of output steps, a first higher order textual feature representation for a corresponding sub-word unit in the sequence of sub-word units tokenized from the respective unspoken textual utterance;

generating, by a non-causal audio-text encoder of the encoder, at each of the plurality of output steps, a second higher order textual feature representation for a corresponding first higher order textual feature representation generated by the text encoder at each of the plurality of output steps;

receiving, as input to a first-pass decoder, the first higher order textual feature representation generated by the text encoder at each of the plurality of output steps;

generating, by the first-pass decoder, at each of the plurality of output steps, a first probability distribution over possible text units;

determining an unpaired causal loss term based on the first probability distribution over possible text units generated at each of the plurality of output steps, the unpaired causal loss term indicating a loss when the encoder operates in a streaming mode;

receiving, as input to a second-pass decoder, the second higher order textual feature representation generated by the non-causal audio-text encoder at each of the plurality of output steps;

generating, by the second-pass decoder, at each of the plurality of output steps, a second probability distribution over possible text units; and determining an unpaired non-causal loss term based on the second probability distribution generated at each of the plurality of output steps, the unpaired non-causal loss term indicating a loss when the encoder operates in a non-streaming mode; and training the encoder based on the unpaired causal loss term and the unpaired non-causal loss term determined for each respective unspoken textual utterance in the set of unspoken textual utterances.

2. The computer-implemented method of claim 1, wherein the first-pass decoder and the second-pass decoder comprise a same decoder.

3. The computer-implemented method of claim 1, wherein the non-causal audio-text encoder comprises one of:

a plurality of unidirectional long short-term memory (LSTM) layers;

a plurality of conformer layers; or a plurality of transformer layers.

4. The computer-implemented method of claim 1, wherein:

the training data further comprises a set of transcribed speech utterances, each transcribed speech utterance in the set of transcribed speech utterances paired with a corresponding transcription and represented by a corresponding sequence of acoustic frames; and the operations further comprise, for each respective transcribed speech utterance in the set of transcribed speech utterances:

generating, by a causal speech encoder of the encoder, at each of the plurality of output steps, a first higher order audio feature representation for a corresponding acoustic frame in the sequence of acoustic frames representing the transcribed speech utterance;

receiving, as input to the first-pass decoder, the first higher order audio feature representation generated by the causal speech encoder at each of the plurality of output steps; and generating, by the first-pass decoder, at each of the plurality of output steps, a first probability distribution over possible speech recognition hypotheses, wherein training the encoder is further based on the first probability distribution over possible speech recognition hypotheses generated by the first-pass decoder at each of the plurality of output steps for each respective transcribed speech utterance in the set of transcribed speech utterances.

5. The computer-implemented method of claim 4, wherein the causal speech encoder comprises one of:

a plurality of unidirectional long short-term memory (LSTM) layers;

a plurality of conformer layers; or a plurality of transformer layers.

6. The computer-implemented method of claim 4, wherein:

the causal speech encoder comprises an initial stack of conformer layers; and the non-causal audio-text encoder comprises a final stack of conformer layers overlain on the initial stack of conformer layers.

7. The computer-implemented method of claim 4, wherein the causal speech encoder and the non-causal audio-text encoder of the encoder are trained using Hybrid Autoregressive Transducer Factorization.

8. The computer-implemented method of claim 7, wherein the operations further comprise, for each respective transcribed speech utterance in the set of transcribed speech utterances:

receiving, as input to the non-causal audio-text encoder, the first higher order audio feature representation generated by the causal speech encoder at each of the plurality of output steps;

generating, by the non-causal audio-text encoder, at each of the plurality of output steps, a second higher order audio feature representation for a corresponding first higher order audio feature representation;

receiving, as input to the second-pass decoder, the second higher order audio feature representation generated by the non-causal audio-text encoder at each of the plurality of output steps; and generating, by the second-pass decoder, at each of the plurality of output steps, a second probability distribution over possible speech recognition hypotheses, wherein training the encoder is further based on the second probability distribution over possible speech recognition hypotheses generated by the second-pass decoder at each of the plurality of output steps for each respective transcribed speech utterance in the set of transcribed speech utterances.

9. The computer-implemented method of claim 8, wherein training the encoder comprises training the encoder using a minimum word error loss function.

10. The computer-implemented method of claim 1, wherein:

each sub-word unit in the sequence of sub-word units comprises one of a phoneme or a wordpiece; and each text unit in the first probability distribution over possible text units comprises a wordpiece.

11. The computer-implemented method of claim 1, wherein the operations further comprise, for each respective unspoken textual utterance in the set of unspoken textual utterances:

upsampling, using a parameter-free duration model, a distribution of the sequence of sub-word units tokenized from the respective unspoken textual utterance; and randomly masking a portion of the upsampled distribution of the sequence of sub-word units.

12. A system comprising:

data processing hardware; and memory hardware in communication with the data processing hardware, the memory hardware storing instructions that when executed on the data processing hardware cause the data processing hardware to perform operations comprising:

receiving training data comprising a set of unspoken textual utterances, each respective unspoken textual utterance in the set of unspoken textual utterances is not paired with any corresponding spoken utterance of speech;

for each respective unspoken textual utterance in the set of unspoken textual utterances:

tokenizing the respective unspoken textual utterance into a sequence of sub-word units;

generating, by a text encoder of an encoder, at each of a plurality of output steps, a first higher order textual feature representation for a corresponding sub-word unit in the sequence of sub-word units tokenized from the respective unspoken textual utterance;

generating, by a non-causal audio-text encoder of the encoder, at each of the plurality of output steps, a second higher order textual feature representation for a corresponding first higher order textual feature representation generated by the text encoder at each of the plurality of output steps;

receiving, as input to a first-pass decoder, the first higher order textual feature representation generated by the text encoder at each of the plurality of output steps;

generating, by the first-pass decoder, at each of the plurality of output steps, a first probability distribution over possible text units;

determining an unpaired causal loss term based on the first probability distribution over possible text units generated at each of the plurality of output steps, the unpaired causal loss term indicating a loss when the encoder operates in a streaming mode;

receiving, as input to a second-pass decoder, the second higher order textual feature representation generated by the non-causal audio-text encoder at each of the plurality of output steps;

generating, by the second-pass decoder, at each of the plurality of output steps, a second probability distribution over possible text units; and determining an unpaired non-causal loss term based on the second probability distribution generated at each of the plurality of output steps, the unpaired non-causal loss term indicating a loss when the encoder operates in a non-streaming mode; and training the encoder based on the unpaired causal loss term and the unpaired non-causal loss term determined the first probability distribution over possible text units generated by the first pass decoder at each of the plurality of output steps for each respective unspoken textual utterance in the set of unspoken textual utterances.

13. The system of claim 12, wherein the first-pass decoder and the second-pass decoder comprise a same decoder.

14. The system of claim 12, wherein the non-causal audio-text encoder comprises one of:

a plurality of unidirectional long short-term memory (LSTM) layers;

a plurality of conformer layers; or a plurality of transformer layers.

15. The system of claim 12, wherein:

the training data further comprises a set of transcribed speech utterances, each transcribed speech utterance in the set of transcribed speech utterances paired with a corresponding transcription and represented by a corresponding sequence of acoustic frames; and the operations further comprise, for each respective transcribed speech utterance in the set of transcribed speech utterances:

generating, by a causal speech encoder of the encoder, at each of the plurality of output steps, a first higher order audio feature representation for a corresponding acoustic frame in the sequence of acoustic frames representing the transcribed speech utterance;

receiving, as input to the first-pass decoder, the first higher order audio feature representation generated by the causal speech encoder at each of the plurality of output steps; and generating, by the first-pass decoder, at each of the plurality of output steps, a first probability distribution over possible speech recognition hypotheses, wherein training the encoder is further based on the first probability distribution over possible speech recognition hypotheses generated by the first-pass decoder at each of the plurality of output steps for each respective transcribed speech utterance in the set of transcribed speech utterances.

16. The system of claim 15, wherein the causal speech encoder comprises one of:

a plurality of unidirectional long short-term memory (LSTM) layers;

a plurality of conformer layers; or a plurality of transformer layers.

17. The system of claim 15, wherein:

the causal speech encoder comprises an initial stack of conformer layers; and the non-causal audio-text encoder comprises a final stack of conformer layers overlain on the initial stack of conformer layers.

18. The system of claim 15, wherein the causal speech encoder and the non-causal audio-text encoder of the encoder are trained using Hybrid Autoregressive Transducer Factorization.

19. The system of claim 18, wherein the operations further comprise, for each respective transcribed speech utterance in the set of transcribed speech utterances:

receiving, as input to the non-causal audio-text encoder, the first higher order audio feature representation generated by the causal speech encoder at each of the plurality of output steps;

generating, by the non-causal audio-text encoder, at each of the plurality of output steps, a second higher order audio feature representation for a corresponding first higher order audio feature representation;

receiving, as input to the second-pass decoder, the second higher order audio feature representation generated by the non-causal audio-text encoder at each of the plurality of output steps; and generating, by the second-pass decoder, at each of the plurality of output steps, a second probability distribution over possible speech recognition hypotheses, wherein training the encoder is further based on the second probability distribution over possible speech recognition hypotheses generated by the second-pass decoder at each of the plurality of output steps for each respective transcribed speech utterance in the set of transcribed speech utterances.

20. The system of claim 19, wherein training the encoder comprises training the encoder using a minimum word error loss function.

21. The system of claim 12, wherein:

each sub-word unit in the sequence of sub-word units comprises one of a phoneme or a wordpiece; and each text unit in the first probability distribution over possible text units comprises a wordpiece.

22. The system of claim 12, wherein the operations further comprise, for each respective unspoken textual utterance in the set of unspoken textual utterances:

upsampling, using a parameter-free duration model, a distribution of the sequence of sub-word units tokenized from the respective unspoken textual utterance; and randomly masking a portion of the upsampled distribution of the sequence of sub-word units.

* * * * *